(12) United States Patent
Yamamoto

(10) Patent No.: US 8,018,354 B2
(45) Date of Patent: Sep. 13, 2011

(54) ONBOARD DISPLAY DEVICE AND DISPLAY METHOD FOR ONBOARD DISPLAY DEVICE

(75) Inventor: Takuo Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 442 days.

(21) Appl. No.: 12/230,605

(22) Filed: Sep. 2, 2008

(65) Prior Publication Data

US 2009/0058684 A1    Mar. 5, 2009

(30) Foreign Application Priority Data

Sep. 3, 2007 (JP) ................. 2007-228071

(51) Int. Cl.
*B60Q 1/00* (2006.01)
*G08G 1/123* (2006.01)
*H04B 3/36* (2006.01)
*H04N 7/18* (2006.01)
*G09G 5/00* (2006.01)
*G06K 9/00* (2006.01)

(52) U.S. Cl. .............. 340/995.11; 340/435; 340/995.14; 348/148; 345/1.1; 345/4; 345/5; 382/103

(58) Field of Classification Search .................. None
See application file for complete search history.

(56) References Cited

U.S. PATENT DOCUMENTS

| | | | |
|---|---|---|---|
| 5,757,268 A | 5/1998 | Toffolo et al. | |
| 5,983,161 A * | 11/1999 | Lemelson et al. | 701/301 |
| 6,243,482 B1 * | 6/2001 | Eibert et al. | 382/103 |
| 7,463,281 B2 * | 12/2008 | Luskin et al. | 348/148 |
| 2004/0178894 A1 * | 9/2004 | Janssen | 340/435 |
| 2004/0233124 A1 * | 11/2004 | Eggers et al. | 345/1.1 |
| 2007/0273638 A1 * | 11/2007 | Nohno et al. | 345/156 |

FOREIGN PATENT DOCUMENTS

| | | |
|---|---|---|
| DE | 199 50 155 C1 | 5/2001 |
| DE | 696 13 653 T2 | 5/2002 |
| DE | 697 12 501 T2 | 12/2002 |
| DE | 103 13 001 A1 | 10/2004 |
| DE | 103 39 050 A1 | 3/2005 |
| JP | A-2002-277258 | 9/2002 |
| JP | A-2004-535971 | 12/2004 |
| JP | A-2005-324745 | 11/2005 |
| JP | A-2007-159036 | 6/2007 |
| JP | A-2007-519984 | 7/2007 |
| WO | WO 03/005102 A1 | 1/2003 |
| WO | WO 2005/080135 A1 | 9/2005 |

OTHER PUBLICATIONS

Chinese Office Action issued in Application No. 200810147581.6; Dated Aug. 4, 2010 (With Translation).

* cited by examiner

*Primary Examiner* — Jennifer Mehmood
*Assistant Examiner* — Fekadeselassie Girma
(74) *Attorney, Agent, or Firm* — Oliff & Berridge, PLC

(57) ABSTRACT

An onboard display device has a pickup unit that picks up nighttime environment to acquire a nightview image, a display that can display a nightview image together with a map image, and a display control unit that displays an information-providing image that is different from the map image and the nightview image on the display and controls displays of the map image and the nightview image, when the information-providing image has to be displayed in a state in which the map image and the nightview image are displayed on the display.

18 Claims, 11 Drawing Sheets

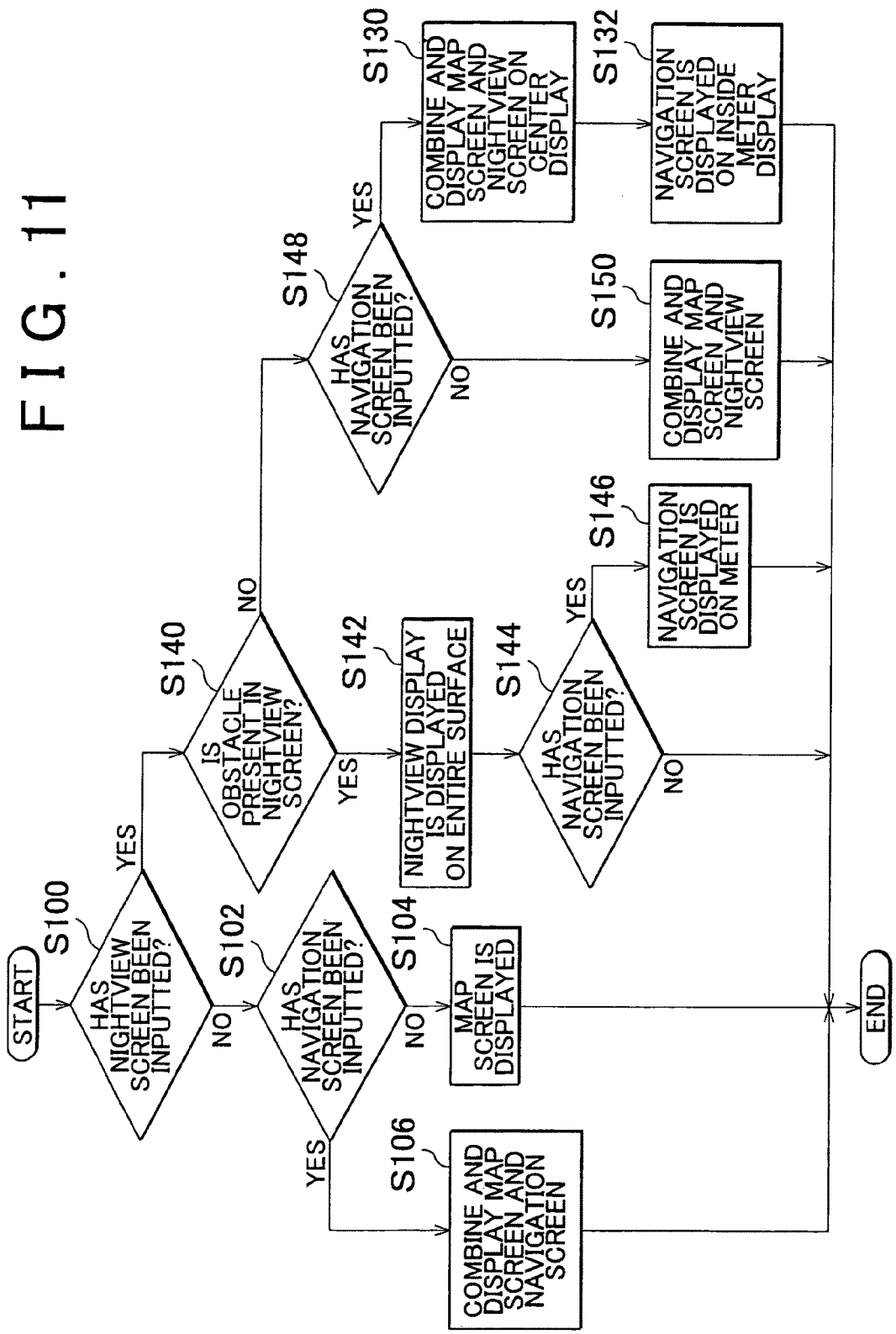

ONBOARD DISPLAY DEVICE AND DISPLAY METHOD FOR ONBOARD DISPLAY DEVICE

INCORPORATION BY REFERENCE

The disclosure of Japanese Patent Application No. JP-2007-228071 filed on Sep. 3, 2007 including the specification, drawings and abstract is incorporated herein by reference in its entirety.

BACKGROUND OF THE INVENTION

1. Field of the Invention

The present invention relates to an onboard display device that adequately displays a nightview image, a map image, and information-providing images such as an intersection guidance image and a display method for an onboard display device.

2. Description of the Related Art

In the field of display devices for vehicles that incorporate a nightview image display unit that displays a nightview image in front of the vehicle, the technology for identifying an obstacle present in front of the vehicle in the nightview image and displaying an image region including the obstacle on a large scale on the nightview image display unit when the obstacle has been identified, as described in Japanese Patent Application Publication No. 2007-159036 (JP-A-2007-159036).

However, although a nightview image is useful from the standpoint of enhancing the visibility for the driver in the nighttime, a comparatively expensive display (for example, a full-TFT display) has to be separately provided to display the nightview image. For example, in the configuration described in JP-A-2007-159036, a display at a meter is used, but the display incorporated in the meter has to be configured by a full-TFT display, thereby raising the display cost.

On the other hand, a display of a navigation device is intrinsically capable of high-performance displaying and also can display nightview images. Where the display of a navigation device is used in the aforementioned configuration to display the nightview images, a another display for displaying nightview images becomes unnecessary and the cost may be reduced. However, because a nightview image is displayed on the display of a navigation device in such a configuration, the display output from the navigation device is restricted and operability of the navigation device may be degraded.

SUMMARY OF THE INVENTION

The present invention provides an onboard display device and method that can display both nightview images and navigation images, for example map images, without degrading the operability of a navigation device.

A first aspect of the present invention relates to an onboard display device including: a pickup unit that picks up nighttime environment to acquire a nightview image; a display that can display the nightview image together with a map image; and a display control unit that displays an information-providing image that is different from the map image and the nightview image on the display and controls a display of the map image and the nightview image, when the information-providing image has to be displayed in a state in which the map image and the nightview image are displayed on the display.

According to the above-described aspect, an onboard display device is obtained that can display both the nightview image and the map image, without degrading the operability of a navigation device.

A second aspect of the present invention relates to an onboard display device including: a pickup unit that picks up nighttime environment to acquire a nightview image; a display that can combine and display a plurality of images including the nightview image; and a display control unit that selectively combines and displays the plurality of images. The display control unit combines and displays the nightview image on the display, based on a priority order of information necessary for a user.

A third aspect of the present invention relates to a display method for an onboard display device, the method including: picking up nighttime environment to acquire a nightview image; and displaying an information-providing image that is different from the map image and the nightview image on a display and controlling a display of a map image and the nightview image, when an information-providing image has to be displayed in a state in which the map image and the nightview image have been displayed on the display.

A fourth aspect of the present invention relates to a display method for an onboard display device, the method including: picking up nighttime environment to acquire a nightview image; and performing a combined display of a plurality of images including the nightview image on a display based on a priority order of information necessary for a user.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 11 is a flowchart illustrating another example of main processing executed by the display control unit of the second embodiment.

DETAILED DESCRIPTION OF EMBODIMENTS

Figure 1:
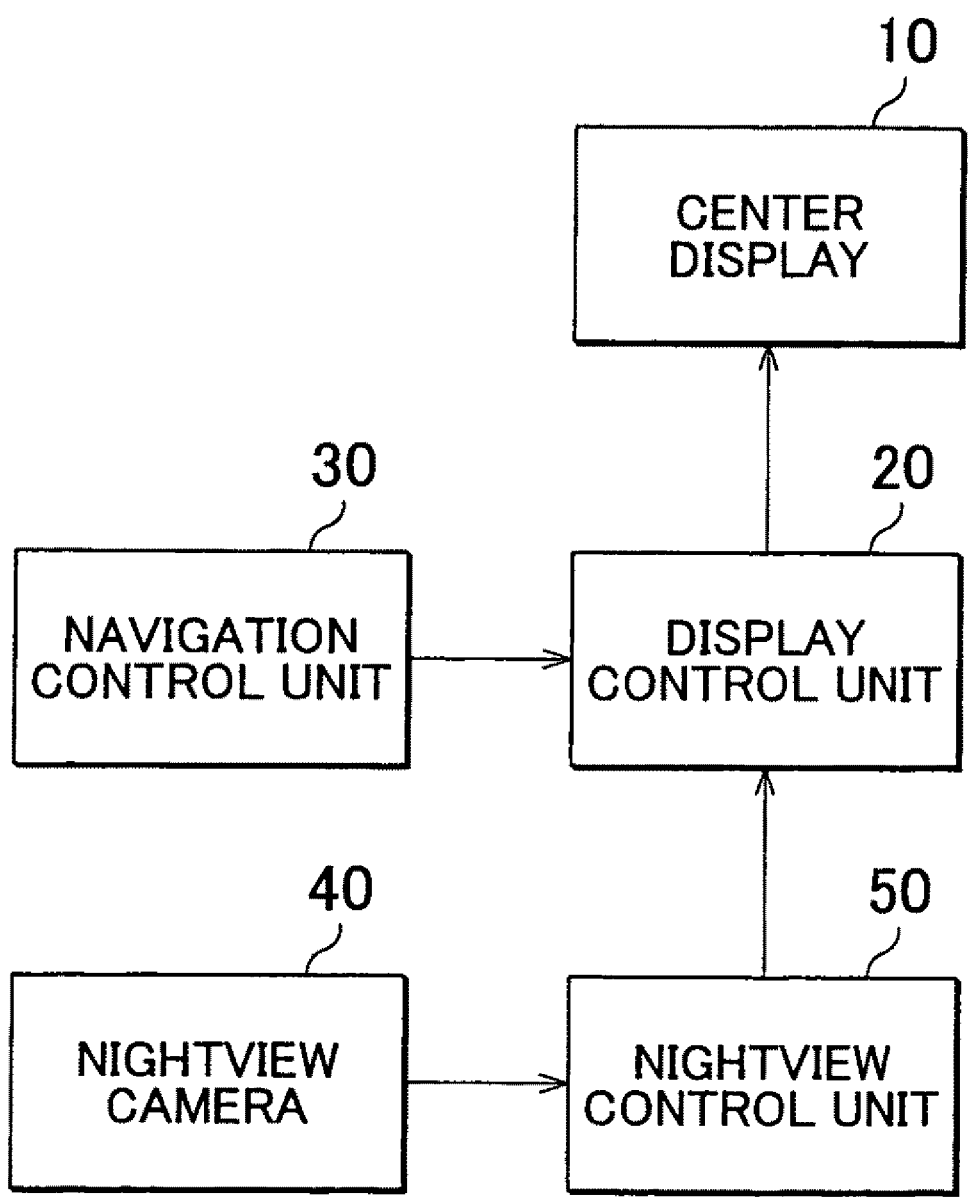
FIG. 1 shows a system configuration diagram illustrating the main configuration of the onboard display device of a first embodiment of the present invention.

FIG. 1 shows a system configuration diagram illustrating the main configuration of a first embodiment of an onboard display device 1 of the present invention.

As shown in FIG. 1, the onboard display device 1 includes a center display 10, a display control unit 20, a navigation control unit 30, a nightview camera 40, and a nightview control unit 50.

The center display 10 may be, for example, a full-TFT display. The center display 10 is disposed in a location in which it can be easily viewed by a driver of the vehicle, for example, close to the center of the instrument panel of the vehicle.

The display control unit 20 selectively combines and displays, according to a predetermined logic, a map screen sent from the navigation control unit 30, a navigation screen such as an enlarged drawing of an intersection, a variety of operation screens, and a nightview screen sent from the nightview control unit 50. The operation mode of the display control unit will be described below in detail.

The navigation control unit 30 computes the host vehicle position based on a Global Positioning System (GPS) signal in a predetermined period, when the navigation function is in an ON state, creates a map screen based on the host vehicle position and a map database, and transmits the image to the display control unit 20. For example, the navigation control unit 30 also displays a navigation screen of an enlarged drawing of an intersection when a route guidance point has reached in the route guidance to a destination set by the user and sends the created navigation screen to the display control unit 20.

The nightview camera 40 may be a near-infrared camera having a lens and pick-up elements such as near-infrared or infrared-sensitive Charged Coupled Device (CCD) or Complementary Metal Oxide Semiconductor (CMOS). The navigation camera 40 is disposed at a position and an orientation, for example, which can pick up a predetermined range of view in front of the vehicle. The nightview camera 40 is turned on in response to an ON command from the nightview control unit 50.

The nightview control unit 50 operates the nightview camera 40 in response to an operation input from the user. Alternatively, the nightview control unit 50 may operate the nightview camera 40 automatically when the vehicle approaches an intersection in the nighttime. The nightview control unit 50 converts the signal sent from the nightview camera 40 into an image signal and sends the image signal to the display control unit 20. The nightview control unit 50 also has a function of detecting an obstacle (typically, a person such as a pedestrian) to which the driver's attention has to be drawn and, when an obstacle is detected, sending a specified image of the obstacle. There are a variety of methods for identifying and detecting obstacles, and any adequate method may be employed. For example, a method such as described in JP-A-2007-159036 may be used.

Figure 2:
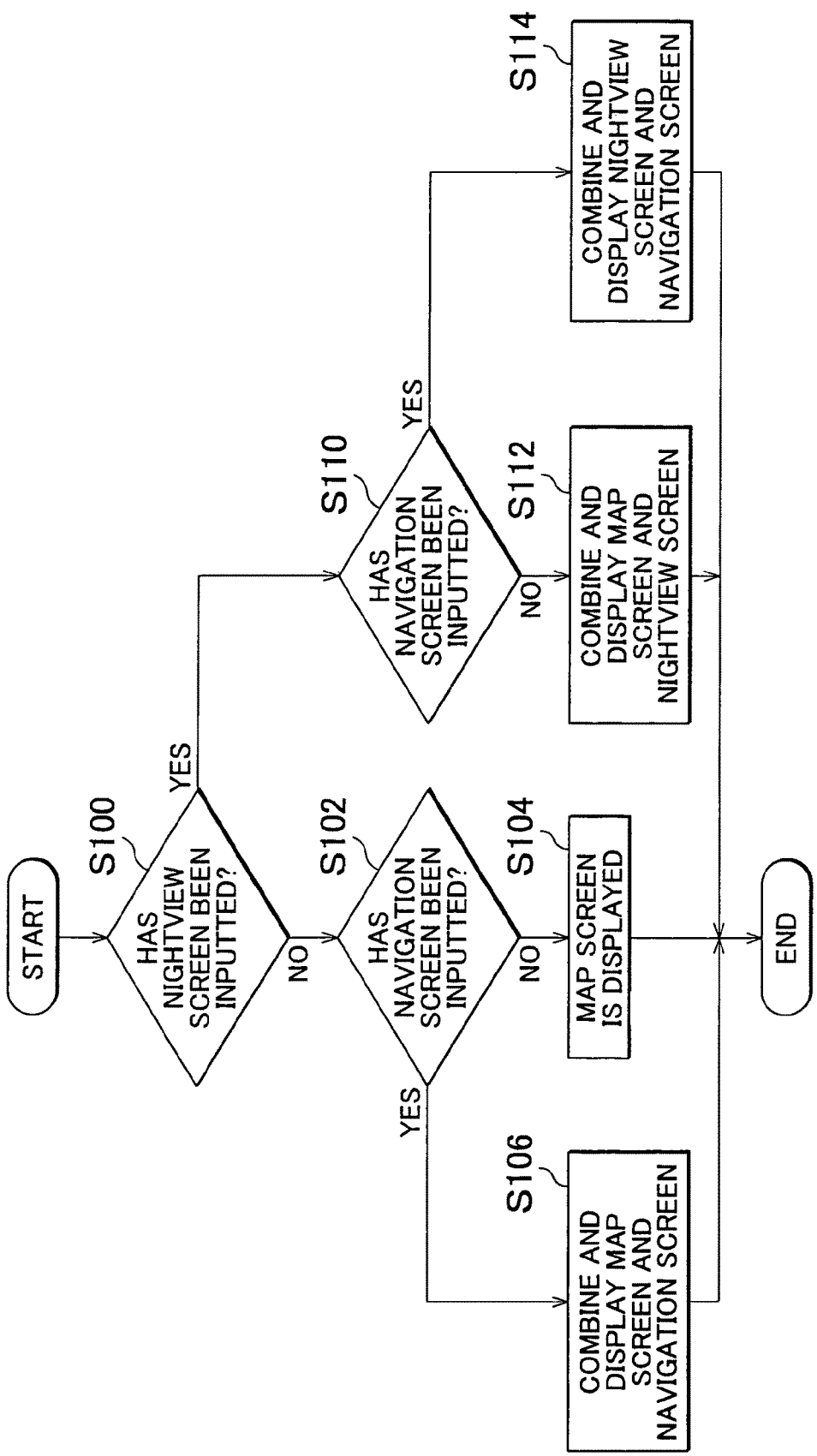
FIG. 2 is a flowchart illustrating an example of main processing executed by the display control unit of the first embodiment.

FIG. 2 is a flowchart illustrating an example of a main processing executed by the display control unit 20 of the present example. The process shown in FIG. 2 may be repeatedly executed in a predetermined period, for example, during the route guidance performed by the navigation control unit 30. During the process, a map screen is continuously sent from the navigation control unit 30 to the display control unit 20.

In step 100, the display control unit 20 determines whether there is an input of a nightview screen from the nightview control unit 50 to the display control unit 20. Thus, it determines whether the nightview system is ON. When the nightview system is ON (YES in step 100), a nightview screen is being sent from the nightview control unit 50. Therefore, the process advances to step 110, and when the nightview system is OFF (NO in step 100), a nightview screen is not being sent from the nightview control unit 50. Therefore, the process advances to step 102.

In step 102, the display control unit 20 determines whether there is an input of a navigation screen, such as an enlarged drawing of an intersection, from the navigation control unit 30 to the display control unit 20. Thus, it determines whether a necessity to display the enlarged drawing of an intersection or the like has occurred during the route guidance performed by the navigation control unit 30. When the necessity to display the enlarged drawing of an intersection or the like has occurred during the route guidance performed by the navigation control unit 30 (YES in step 102), the navigation screen of the enlarged drawing of an intersection or the like is being sent from the navigation control unit 30. Therefore, the process advances to step 106, and in the other case (NO in step 102), the process advances to step 104.

In step 104, the display control unit 20 displays a map image on the center display 10, as in its general manner, because there is no necessity to display the enlarged drawing of an intersection or the like.

Figure 3:
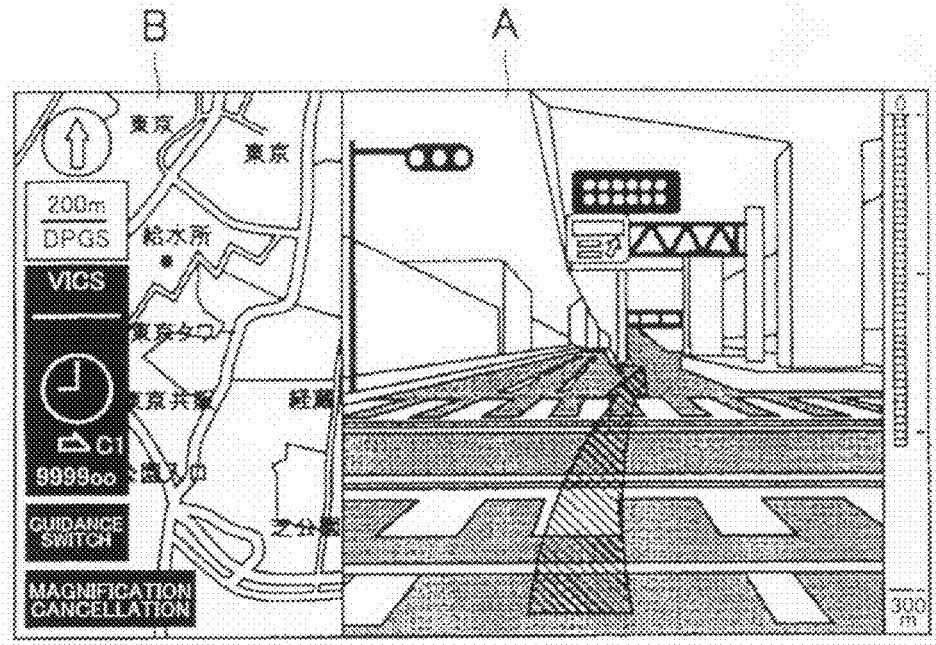
FIG. 3 illustrates a display example of a combined screen of a navigation screen and a map screen.

In step 106, based on the map screen and navigation screen, such as the enlarged drawing of an intersection, obtained from the navigation control unit 30, the display control unit 20 generates a screen in which the screens are combined and displays the combined screen on the center display 10. Thus, the navigation screen is inserted in the map screen, as an interruption, on the center display 10. FIG. 3 shows an example of such combined screen. In FIG. 3, an enlarged drawing of an intersection is displayed on a region A of the center display 10 and a map screen is displayed on the other region B.

Thus, when the nightview system is OFF, the display control unit 20 displays a map screen on the center display 10, as in its general manner, and when a route guidance point has reached, the display control unit 20 displays a combined screen of the navigation screen and the map screen.

In step 110, the display control unit 20 determines whether there is an input of a navigation screen, such as an enlarged drawing of an intersection, from the navigation control unit 30, in the same manner as in the above-described step 102. When the determination in this step 110 is affirmative, the process advances to step 114, and when the result is negative, the process advances to step 112.

Figure 4:
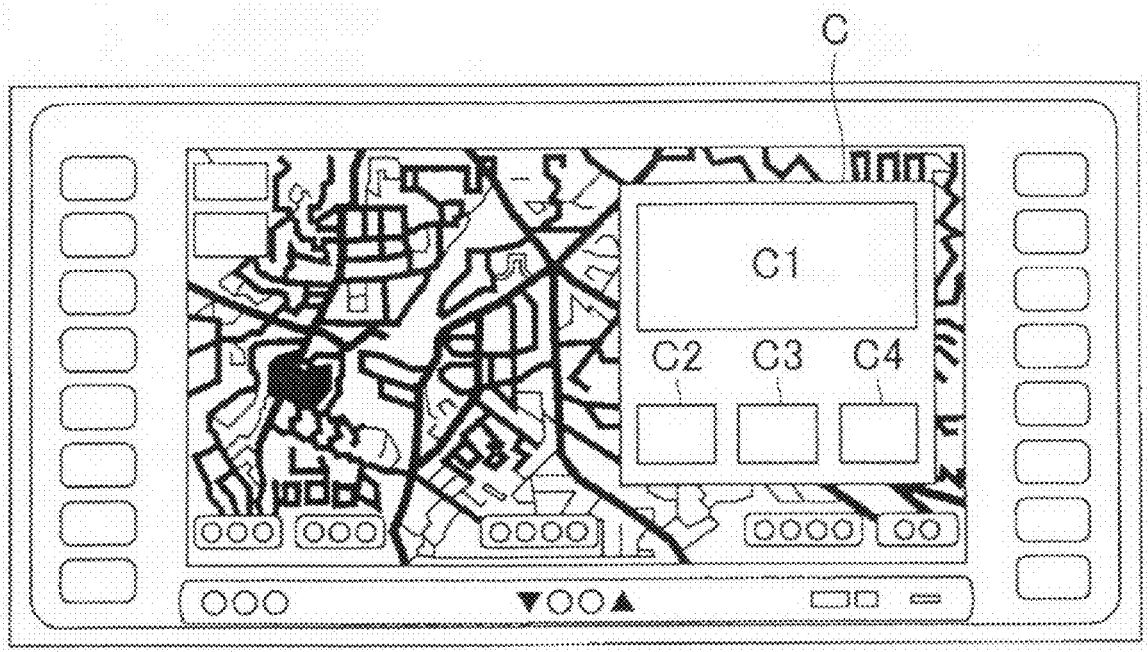
FIG. 4 illustrates a display example of a combined screen of a nightview screen and a map screen.

In step 112, based on the map screen obtained from the navigation control unit 30 and the nightview screen obtained from the nightview controlled unit 50, the display control unit 20 generates a screen in which the screens are combined and displays the combined screen on the center display 10. FIG. 4 shows an example of such combined screen. In FIG. 4, the nightview screen is displayed on a portion C1 of a region C of the center display 10, and the switches are displayed on portions C2 to C4 of the region C. For example, a switch displayed on C2 is a full-screen switch, and where this switch is pushed, the nightview screen is displayed over the entire region of the center display 10. Further a switch displayed on C3 is a switch for turning off the nightview system. Where the switch displayed on C3 is pushed, the nightview system is turned off, so that the input of the nightview screen is restricted, and the screen is changed to the screen based on the process of the above-described step 104 to step 106. The switch displayed on C2 etc. may be set at a steering wheel or other control devices.

Figure 5:
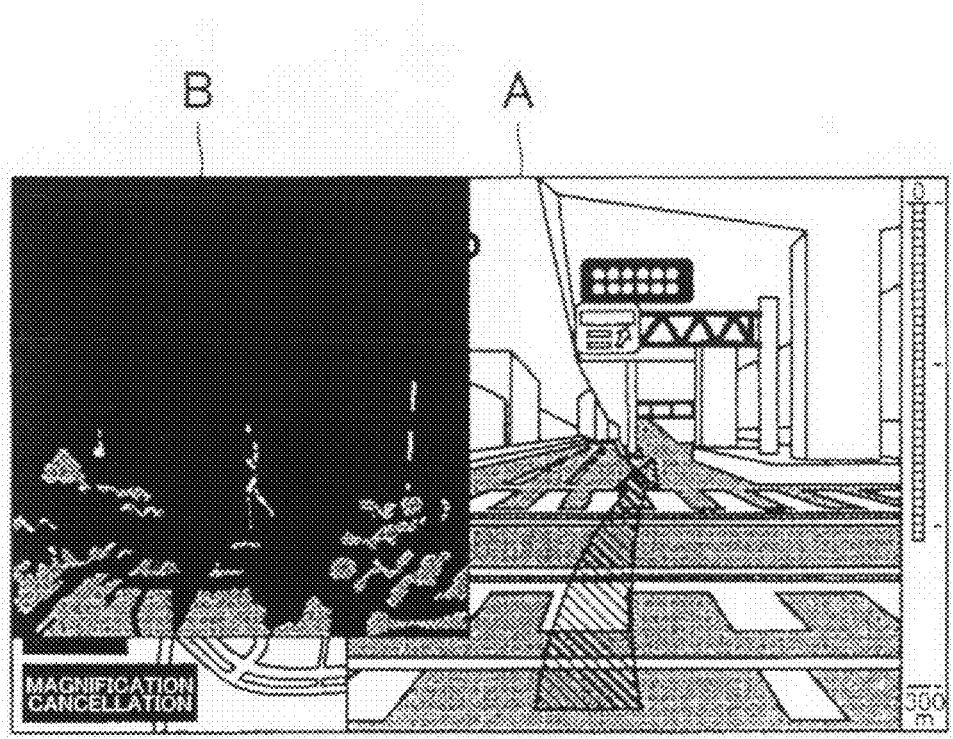
FIG. 5 illustrates a display example of a combined screen of a nightview screen and a navigation screen.

In step 114, based on the navigation screen obtained from navigation control unit 30 and the nightview screen obtained from the nightview control unit 50, the display control unit 20 generates a screen in which the screens are combined and displays the combined screen on the center display 10. FIG. 5 shows an example of such combined screen. In FIG. 5, an enlarged drawing of an intersection is displayed in a region A in the right half of the center display 10, and the nightview screen is displayed in a region B in the left half. The regions of the nightview screen and the enlarged drawing of an intersection are not necessarily arranged with respect to each other as shown in FIG. 5. Thus, the left-right arrangement thereof may be inverted, or one display region may be made significantly larger than the other. Further, regions A and B in FIG. 5 may or may not match the regions A and B shown in FIG. 3. The combined screen shown in FIG. 5 is switched to the screen in general (for example, such as shown in FIG. 4) at an adequate stage (a state in which the vehicle passes through the intersection relating to the route guidance point).

In step 114, a combined screen of the navigation screen and map screen (see FIG. 3) may be displayed instead of the combined screen of the navigation screen and nightview screen. Further, in step 106 and step 114, a voice guidance message and/or a sound effect corresponding to the navigation screen may be output when the navigation screen is displayed.

Figure 6:
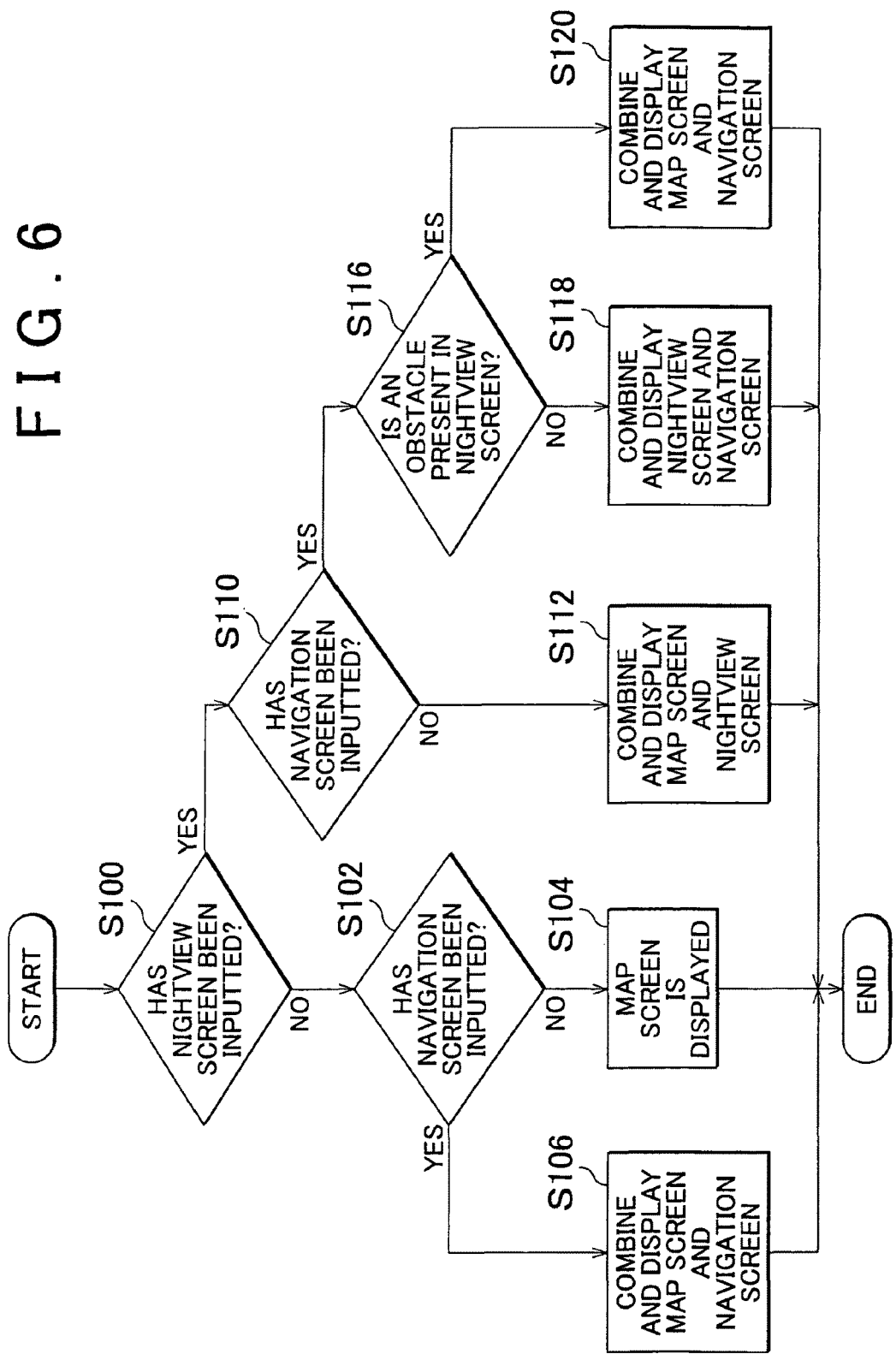
FIG. 6 is a flowchart illustrating another example of main processing executed by the display control unit of the first embodiment.

FIG. 6 is a flowchart illustrating another example of the main process executed by the display control unit 20 of the first embodiment. In FIG. 6, the steps identical to those of FIG. 3 are assigned with identical step numbers and the explanation thereof is omitted.

In FIG. 6, when the determination of step 110 is affirmative, the process advances to step 116. In step 116, the display control unit 20 determines whether a nightview screen, in which an obstacle is specified, is being sent from the nightview control unit 50. Thus, it determines whether an obstacle is present in the nightview screen. When a nightview screen, in which an obstacle is specified, is being sent from the nightview control unit 50 (YES in step 110), the process advances to step 118, and in the other case (NO in step 110), the process advances to step 120.

Figure 7:
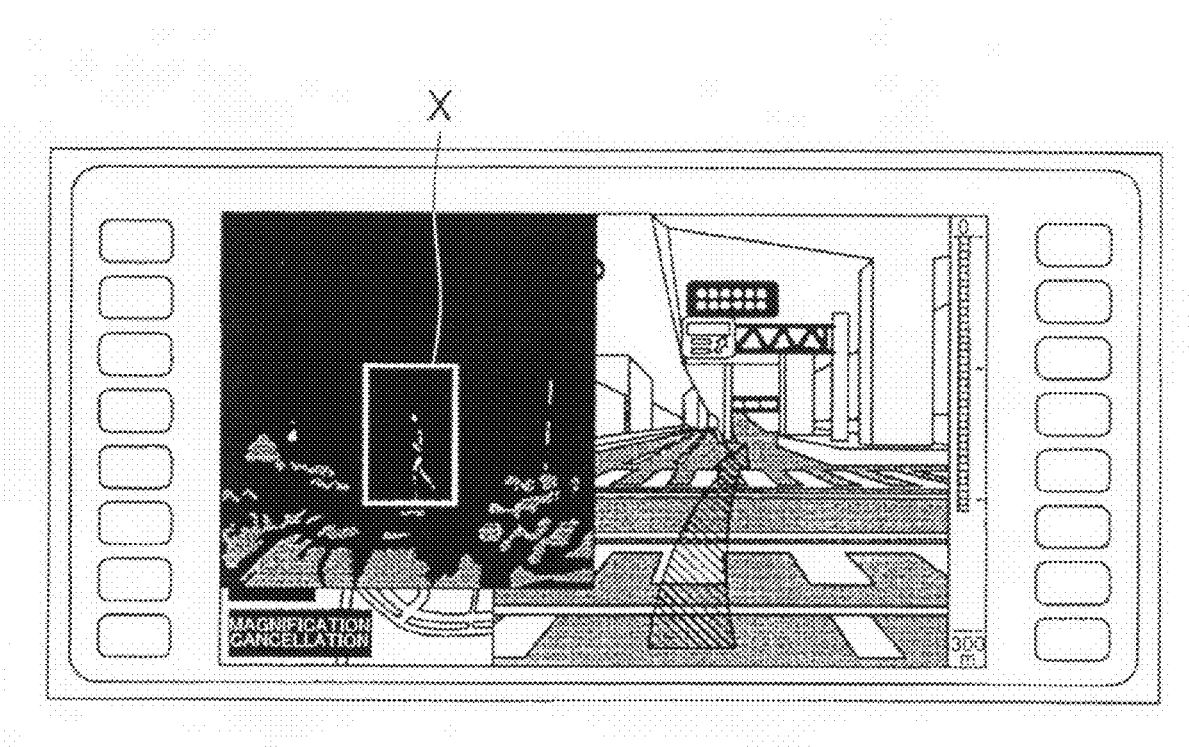
FIG. 7 illustrates a display example of a combined screen of a nightview screen in which an obstacle is specified and a navigation screen.

In step 118, based on the navigation screen obtained from the navigation control unit 30 and the nightview screen (in which an obstacle is specified) obtained from the nightview control unit 50, the display control unit 20 generates a screen in which the screens are combined and displays the combined screen on the center display 10. FIG. 7 shows an example of such combined screen. In FIG. 7, an enlarged drawing of an intersection is displayed on a region A in the right half of the center display 10, and the nightview screen, in which an obstacle is specified, is displayed on a region B in the left half. In the example shown in the figure, the obstacle is a person and the presence thereof is marked by a rectangular frame shown by X.

In step 120, based on the map screen and navigation screen such as an enlarged drawing of an intersection obtained from the navigation screen unit 30, the display control unit 20 generates a screen in which the screens are combined and displays the combined screen on the center display 10 in the same manner as in the above-described step 106. This is because when an obstacle to which driver's attention has to be drawn is not present in the nightview screen, the navigation screen is more useful than the nightview screen and, therefore, has a priority higher than that of the nightview screen.

When an obstacle is present in the nightview screen, in step 112 of the process shown in FIG. 6, the nightview screen may be displayed over the entire surface of the central display 10.

Further, in step 106, step 114, and step 120, a voice guidance message corresponding to the navigation screen may be also output when the navigation screen is displayed. Likewise, in step 118, a voice guidance message that draws attention the obstacle may be output.

With the onboard display device 1 of the above-described first embodiment and the other example thereof, the following effects are obtained.

First, because a nightview screen is displayed on the central display 10 used for displaying a map screen or the like, it becomes unnecessary to set a comparatively expensive display (for example, a head-up display (HUD) for nightview display, or a display incorporated in a meter that is configured by a full-TFT display panel for nightview display) for displaying the nightview screen, and therefore, a configuration that is advantageous in terms of cost may be realized.

Despite the nightview screen is displayed on the central display 10 in a limited display range, the display of the map screen or the navigation screen is restricted, a screen that has to be adequately displayed is selected with consideration for the priority of the screens, the effect of this restriction may be reduced and the degrading of operability for the user may be prevented. Thus, in the present embodiment, an approach is followed such that in the example shown in FIG. 2, the three screens are created on one central display 10 based on the priority order represented by the following relationship: navigation screen (intersection guidance)>nightview screen>map screen. In the example shown in FIG. 5, the four screens are created on one central display 10 based on the priority order represented by the following relationship: nightview screen including an obstacle>navigation screen (intersection guidance)>nightview screen including no obstacle>map screen. As a result, it is possible to realize an inexpensive configuration that can efficiently use a limited display region, without degrading the operability for the user.

Figure 8:
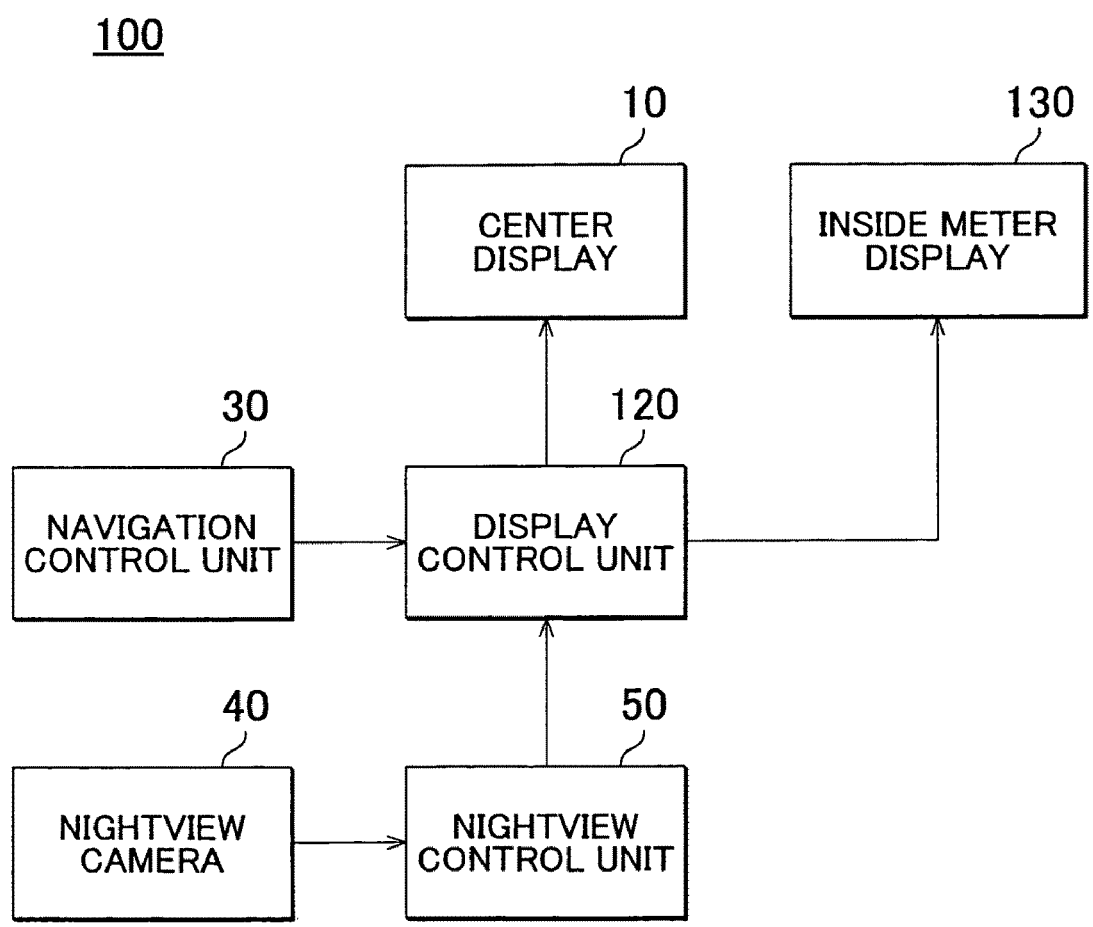
FIG. 8 is a system configuration diagram illustrating the main configuration of the onboard display device of a second embodiment of the present invention.

FIG. 8 is a system configuration diagram illustrating the main configuration of an onboard display device 100 of a second embodiment of the present invention. In the second embodiment, the components identical to those of the above-described first embodiment are assigned with identical reference numerals and appropriate explanation thereof is omitted. The main difference between the configuration of the second embodiment and that of the first embodiment is that the former includes an inside meter display 130.

The inside meter display 130 is a display disposed in a meter that displays a vehicle speed or the like. It is preferred that the inside meter display 130 be configured by an inexpensive display that can display simple figures, rather than by an expensive display such as a full-TFT display.

The display control unit 120 selectively combines and displays, according to a predetermined logic, a map screen sent from the navigation control unit 30, a navigation screen such as an enlarged drawing of an intersection, a variety of operation screens, and a nightview screen sent from the nightview control unit 50. The display control unit 120 also controls the display of the inside meter display 130, in addition to the display on the central display 10. The operation mode of the display control unit will be described below in detail.

Figure 9:
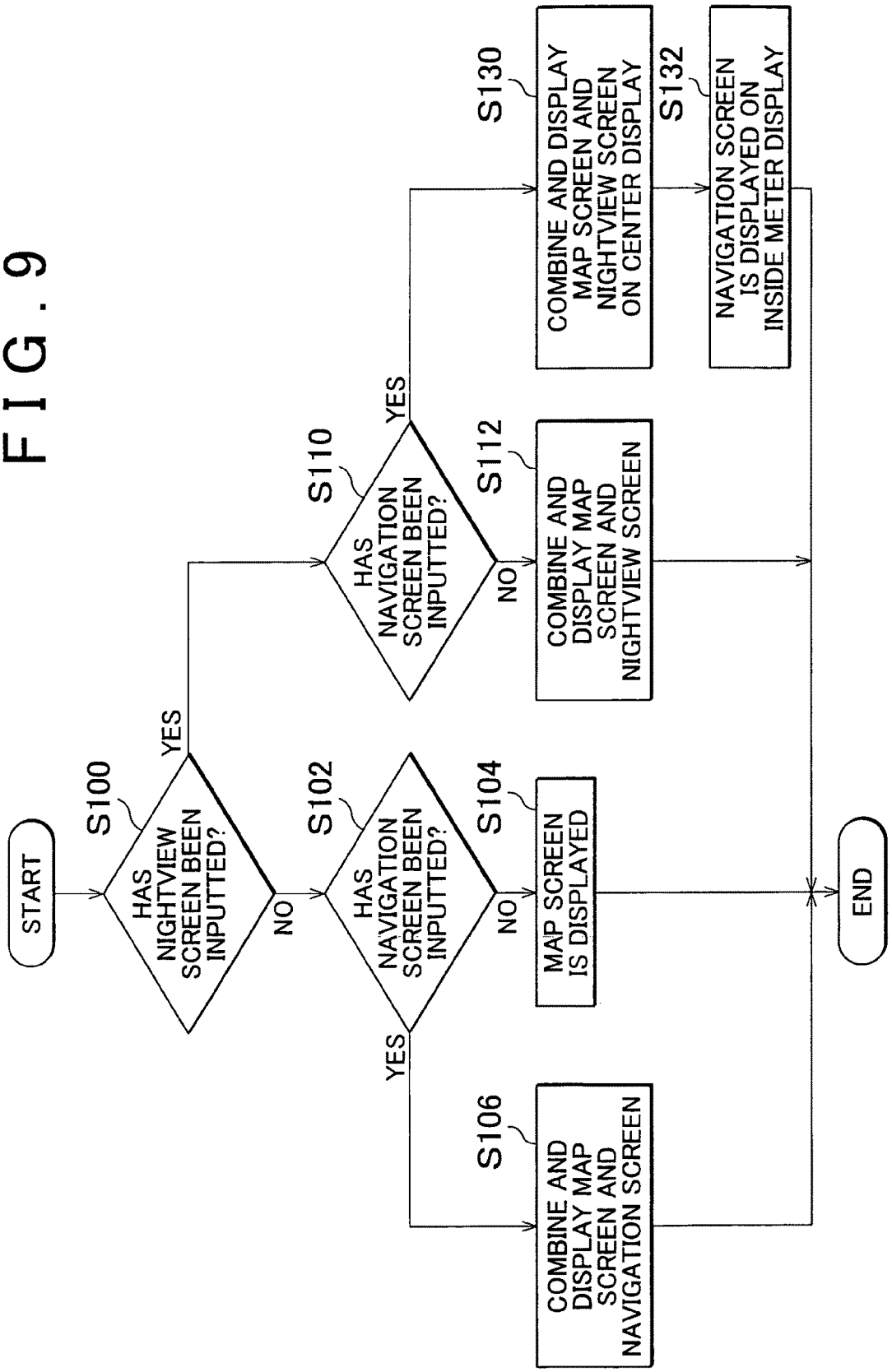
FIG. 9 is a flowchart illustrating an example of main processing executed by the display control unit of the second embodiment.

FIG. 9 is a flowchart illustrating an example of a main processing executed by the display control unit 120 of the present example. The process shown in FIG. 9 may be repeatedly executed in a predetermined period, for example, during the route guidance performed by the navigation control unit 30. During the process, a map screen is continuously sent from the navigation control unit 30 to the display control unit 120. In FIG. 9, the steps identical to those in the above-described FIG. 3 are assigned with identical step numbers and the explanation thereof is omitted.

In FIG. 9, when the determination result obtained in step 110 is affirmative, the process advances to step 130. In step 130, based on the map screen obtained from the navigation control unit 30 and the nightview screen obtained from nightview control unit 50, the display control unit 120 creates a screen in which the screens are combined and displays the combined screen on the central display 10 in the same manner as in the above-described step 112 (see FIG. 4).

Figure 10A:
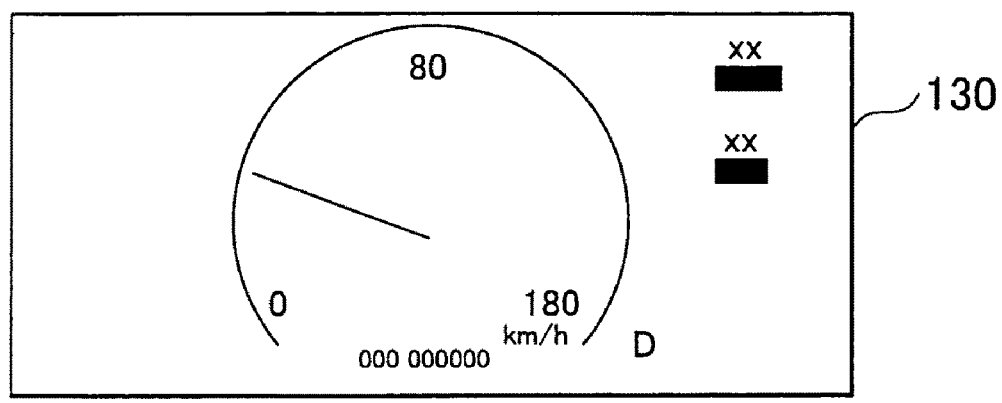
FIG. 10A shows a display state of a display incorporated in a meter during normal operation.
Figure 10B:
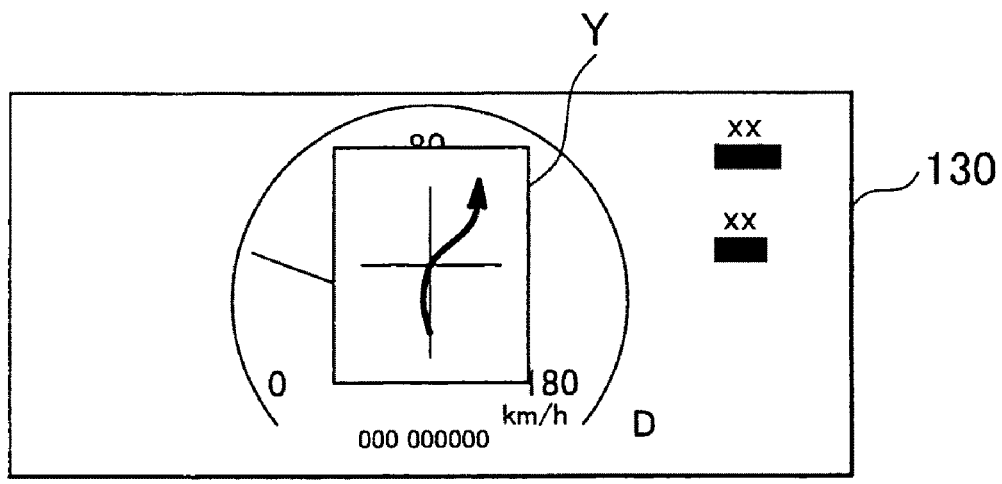
FIG. 10B shows a display state of a display incorporated in a meter and displaying an example of a navigation screen.

In step 132, the display control unit 120 displays the navigation screen such as an intersection guidance drawing on the inside meter display 130. This navigation screen may be a guidance screen in a simple format, that is, different from the navigation screen sent from the navigation control unit 30. In this case, the simplified guidance screens may be a plurality of patterns prepared in advance and an appropriate simplified guidance screen may be selected in accordance with the guidance mode of the navigation control unit 30. FIG. 10A shows a normal display state of the inside meter display 130, and FIG. 10B shows a display state of the inside meter display 130 in which an example of such a navigation screen is displayed. In the example shown in FIG. 10B, a guidance screen of a simple format is displayed on a display region Y of the inside meter display 130. In this case, by looking at both the central display 10 (FIG. 4) and the inside meter display 130 (FIG. 10B), the user (in particular, the driver) can obtain information from the map screen, nightview screen, and navigation screen.

Because the display region of the inside meter display 130 is limited, the simplified guidance screen may be displayed so as to hide the other display (in the present example, the speed display) as shown in FIG. 10B. In this case, at an adequate stage (a stage in which the vehicle passes through a route guidance point), the simplified guidance screen may not be displayed at all.

In step 106 and step 132, a voice guidance message corresponding to the navigation screen may be output during the display of the navigation screen. Further, in step 106 shown in FIG. 9, only the map screen may be displayed on the central display 10, as in its general manner, and the navigation screen may be displayed on the inside meter display 130, as shown in FIG. 10B, instead of displaying a combined screen of the navigation screen and the map screen on the central display 10. In this case, the amount of information shown on the navigation screen is small because of a simple format thereof. However the navigation screen is always displayed (becomes a turn-by-turn (TBT) type navigation) on the inside meter display 130, regardless of the display state of the nightview screen. Therefore, the user may be saved from confusion caused by displaying the navigation screen on the different displays during daytime and nighttime.

FIG. 11 is a flowchart illustrating another example of the main process executed by the display control unit 120 of another example of the second embodiment. In FIG. 11, the steps identical to those in the above-described FIGS. 3 and 9 are assigned with identical step numbers and the explanation thereof is omitted.

In FIG. 11, when the determination result obtained in step 100 is affirmative, the process advances to step 140. In step 140, the display control unit 120 determines whether a nightview screen, in which an obstacle is specified, has been received from the nightview control unit 50 in the same manner as in step 116 of the above-described FIG. 6. Thus, it determines whether an obstacle is present in the navigation screen. When a nightview screen in which an obstacle is specified has been received from the nightview control unit 50 (YES in step 140), the process advances to step 142, and in the other case (NO in step 140), the process advances to step 148.

Figure 12:
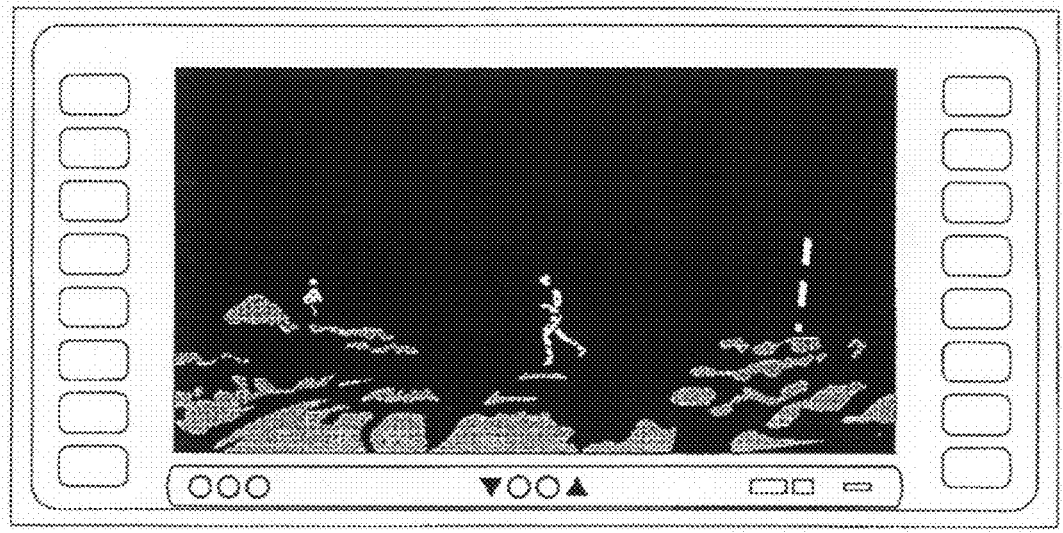
FIG. 12 illustrates a display state of a center display 10 in which a nightview screen having an obstacle specified therein is displayed over the entire screen.

In step 142, the display control unit 120 displays the nightview screen from the nightview control unit 50 (in which an obstacle is specified) on the entire surface of the central display 10. FIG. 12 shows the central display 10 in which the nightview screen, in which an obstacle is specified, is displayed on the entire surface.

In step 144, the display control unit 120 determines whether a navigation screen, such as an enlarged drawing of an intersection, has been received from the navigation control unit 30, in the same manner as in the above-described step 102. When the determination result obtained in step 144 is affirmative, the process advances to step 146. On the other hand, when the result is negative, the process of the this period ends as it is. In this case, the nightview screen is displayed on the entire surface of the central display 10, and the usual display (display other than the navigation screen or no display at all) is shown in the inside meter display 130. Therefore, in this case, the user (in particular, the driver) can easily recognize the information relating to the obstacle from the nightview screen that is displayed in a large scale on the central display 10.

In step 146, the display control unit 120 displays the navigation screen, such as an intersection guidance drawing, on the inside meter display 130 in the same manner as in the above-described step 132. As a result, by looking at both the navigation screen of the inside meter display 130 (FIG. 10B) and the nightview screen of the central display 10 (FIG. 12), the user can easily recognize the information relating to the obstacle from the nightview screen. Likewise, the display output of the navigation screen may be output as a voice guidance message corresponding to the navigation screen.

In step 148, the display control unit 120 determines whether the navigation screen, such as an enlarged drawing of an intersection, is being sent from the navigation control unit 30, in the same manner as in the above-described step 144. When the determination result of this step 144 is affirmative, the process advances to step 146. On the other hand, when the determination result is negative, the process advances to steps 130 and 132. When the process advances to steps 130 and 132, as explained with respect to FIG. 9, the user can obtain information from the map screen, nightview screen, and navigation screen by looking at both the inside meter display 130 (FIG. 10B) and the central display 10 (FIG. 4). However, in place of the steps 130 and 132, similarly to the above-described step 106 it is also possible to display the combined screen (FIG. 3) of the navigation screen and map screen on the central display 10, while maintaining the inside meter display 130 displaying the normal display (display other than the navigation screen). This is because when an obstacle to which driver's attention has to be drawn is not present in the nightview screen, the navigation screen is more useful and, therefore, has a priority higher than that of the nightview screen.

In step 150, based on the map screen obtained from the navigation control unit 30 and the nightview screen obtained form the nightview control unit 50, the display control unit 120 produces a screen in which the screens are combined and the combined screen is displayed on the central display 10 in the same manner as in the above-described step 112 (see FIG. 4).

In steps 144 and 148 (the same is true for step 110 shown in FIG. 9) shown in FIG. 11, the necessity of displaying a navigation screen is determined based on whether the navigation screen, such as the enlarged drawing of an intersection, is being sent from the navigation control unit 30. However, this necessity may also be determined based on different information, for example information that lets the driver know that the route guidance point is reached, from the navigation control unit 30.

With the onboard display device 100 of the above-described second embodiment and the other example thereof, the following effect is demonstrated in addition to the effects demonstrated in the above-described first embodiment and the other example thereof.

First, when it is necessary to display the navigation screen while the nightview screen is displayed on the central display 10, the navigation screen is displayed on the inside meter display 130 that has an inexpensive configuration, therefore, both the navigation screen and nightview screen may be simultaneously displayed.

Further, because the navigation screen and the nightview screen are displayed on the separate displays, they may be easily displayed in a size suitable for the respective screens.

Further, because the nightview screen is displayed on the central display 10 in a limited display range, the display of the map screen or the navigation screen is restricted. However, because the navigation screen and the nightview screen are displayed on the separate displays, the effect of this restriction is reduced and the degrading of operability for the user may be prevented.

Further in the second embodiment and the other example thereof, an approach is followed such that in the example shown in FIG. 9, the three screens are created on one central display 10 based on the priority order represented by the following relationship: navigation screen (intersection guidance)>nightview screen>map screen. In the example shown in FIG. 11, the four screens are effectively displayed on two displays based on the priority order represented by the following relationship: nightview screen including an obstacle>navigation screen (intersection guidance)>nightview screen including no obstacle>map screen. As a result, it is possible to realize an inexpensive configuration that can efficiently use the limited display region, without degrading the operability for the user.

In the second embodiment and the other example thereof, a simplified navigation screen may be also displayed on a other display such as a HUD for displaying simple figures, instead of displaying the simplified navigation screen on the inside meter display 130.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit scope of the invention.

In the above-described examples, a display of an enlarged drawing of an intersection is described as a navigation screen However, the navigation screen may be any screen, provided that it is a guidance screen created separately from a map screen (including a map screen overlapped with the present position of the vehicle or guidance route). More specifically, the navigation screen may include a screen for displaying information relating to other route guidance, for example, a screen for displaying information of the Vehicle Information and Communication System (VICS), or a screen for displaying traffic information.

What is claimed is:

1. An onboard display device comprising:
   a pickup unit that picks up nighttime environment to acquire a nightview image;
   a display that displays the nightview image together with a map image; and
   a display control unit that displays an information-providing image that is different from the map image and the nightview image on the display and controls a display of the map image and the nightview image, when the information-providing image has to be displayed in a state in which the map image and the nightview image are displayed on the display, wherein
   the display control unit displays the information-providing image and the nightview image, without displaying the map image, when an image of an obstacle that has to draw attention is included in the nightview image and the information-providing image has to be displayed on the display, and
   the display control unit displays the information-providing image and the map image, without displaying the nightview image, when the image of the obstacle that has to draw attention is not included in the nightview image and the information-providing image has to be displayed on the display.

2. The onboard display device according to claim 1, wherein the display control unit lowers a display priority order of the map image and the nightview image when the information-providing image has to be displayed on the display.

3. The onboard display device according to claim 2, wherein the display priority order is lowered by at least one process from among decreasing a display density of the map image and the nightview image, performing no display, decreasing a display area ratio, stopping an image movement, changing a display position, and decreasing an illuminance.

4. The onboard display device according to claim 1, wherein the display control unit displays at least one of the nightview image and the map image, when the information-providing image does not have to be displayed on the display.

5. The onboard display device according to claim 1, wherein the display control unit displays the information-providing image, without displaying at least one of the nightview image and the map image, when the information-providing image has to be displayed on the display.

6. The onboard display device according to claim 5, wherein the display control unit displays the information-providing image and the map image, without displaying the nightview image, when the information-providing image has to be displayed on the display.

7. The onboard display device according to claim 5, wherein the display control unit displays the information-providing image and the nightview image, without displaying the map image, when the information-providing image has to be displayed on the display.

8. The onboard display device according to claim 1, wherein:
   the display comprises a first display, that displays the nightview image together with the map image, and a second display; and
   the display control unit performs control such that the information-providing image is displayed on the second display when the information-providing image has to be displayed in a state where the map image and the nightview image are displayed on the first display.

9. The onboard display device according to claim 8, wherein the display control unit displays the nightview image on the entire surface of the first display when an image of an obstacle is included in the nightview image.

10. The onboard display device according to claim 8, wherein the display control unit displays the information-providing image and the map image on the first display when the information-providing image has to be displayed in a state in which the map image is displayed and the nightview image is not displayed on the first display.

11. The onboard display device according to claim 1, wherein:
the display comprises a first display, that displays the map image together with the nightview image and the information-providing image, and a second display;
the display control unit displays the map image and the nightview image on the first display and performs control such that the information-providing image is displayed on the second display, when an image of an obstacle is included in the nightview image; and
the display control unit displays the map image and the information-providing image on the first display and performs control such that the nightview image is displayed on the second display, when an image of an obstacle is not included in the nightview image.

12. The onboard display device according to claim 8, wherein the second display is a display disposed in a meter, or a head-up display.

13. The onboard display device according to claim 1, wherein the information-providing image is at least one from among an image for route guiding, a screen for displaying road status information, and a screen for displaying traffic information.

14. An onboard display device comprising:
a pickup unit that picks up nighttime environment to acquire a nightview image;
a display that combines and displays a plurality of images including the nightview image, a map image, and an information-providing image; and
a display control unit that selectively combines and displays the plurality of images, wherein
the display control unit combines and displays the nightview image on the display, based on a priority order of information necessary for a user,
the priority order of information necessary for a user is determined based on whether an obstacle is present in the nightview image,
the display control unit displays the information-providing image and the nightview image, without displaying the map image, when an image of an obstacle that has to draw attention is included in the nightview image and the information-providing image has to be displayed on the display, and
the display control unit displays the information-providing image and the map image, without displaying the nightview image, when the image of the obstacle that has to draw attention is not included in the nightview image and the information-providing image has to be displayed on the display.

15. The onboard display device according to claim 14, wherein the plurality of images are the map image and the information-providing image.

16. The onboard display device according to claim 14, wherein:
the display comprises a first display and a second display;
the first display displays an image for which the priority order is high; and
the second display displays an image for which the priority order is lower than the priority order of the first display.

17. A display method for an onboard display device, comprising:
picking up nighttime environment to acquire a nightview image; and
displaying an information-providing image that is different from a map image and the nightview image on a display and controlling a display of the map image and the nightview image, when the information-providing image has to be displayed in a state in which the map image and the nightview image are displayed on the display, wherein
the information-providing image and the nightview image are displayed, without displaying the map image, when an image of an obstacle that has to draw attention is included in the nightview image and the information providing image has to be displayed on the display, and
the information-providing image and the map image are displayed, without displaying the nightview image, when the image of the obstacle that has to draw attention is not included in the nightview image and the information providing image has to be displayed on the display.

18. A display method for an onboard display device, comprising:
picking up nighttime environment to acquire a nightview image;
performing a combined display of a plurality of images including the nightview image, an information-providing image, and a map image on a display based on a priority order of information necessary for user, wherein the priority order of information necessary for a user is determined based on whether an obstacle is present in the nightview image;
displaying, the information-providing image and the nightview image, without displaying the map image, when an image of an obstacle that has to draw attention is included in the nightview image and the information-providing image has to be displayed on the display; and
displaying the information-providing image and the map image, without displaying the night view image, when the image of the obstacle that has to draw attention is not included in the nightview image and the information-providing image has to be displayed on the display.

* * * * *